US011267138B2

(12) United States Patent
Iino et al.

(10) Patent No.: US 11,267,138 B2
(45) Date of Patent: Mar. 8, 2022

(54) PACKAGE IDENTIFICATION CODE, SHEET OR STICKER SHEET DISPLAYING SAME, AND ROBOT HAND USED FOR SAME

(71) Applicants: Hideki Iino, Utsunomiya (JP); Kiyoshi Aoki, Oyama (JP); Hayato Horikoshi, Oyama (JP)

(72) Inventors: Hideki Iino, Utsunomiya (JP); Kiyoshi Aoki, Oyama (JP); Hayato Horikoshi, Oyama (JP)

(*) Notice: Subject to any disclaimer, the term of this patent is extended or adjusted under 35 U.S.C. 154(b) by 124 days.

(21) Appl. No.: 16/756,469

(22) PCT Filed: Nov. 6, 2018

(86) PCT No.: PCT/JP2018/041187
§ 371 (c)(1),
(2) Date: Apr. 16, 2020

(87) PCT Pub. No.: WO2019/093328
PCT Pub. Date: May 16, 2019

(65) Prior Publication Data
US 2021/0107750 A1 Apr. 15, 2021

(30) Foreign Application Priority Data
Nov. 8, 2017 (JP) ............... JP2017-215383

(51) Int. Cl.
*B25J 9/16* (2006.01)
*B25J 15/06* (2006.01)
(Continued)

(52) U.S. Cl.
CPC ......... *B25J 15/0616* (2013.01); *B25J 9/1697* (2013.01); *G06K 7/14* (2013.01);
(Continued)

(58) Field of Classification Search
CPC .. B25J 15/0616; B25J 9/1697; B25J 15/0014; B25J 9/1687; G06K 7/14; B65D 5/4212;
(Continued)

(56) References Cited

U.S. PATENT DOCUMENTS 4,638,171 A 1/1987 Gassmann
5,232,332 A 8/1993 Focke
(Continued)

FOREIGN PATENT DOCUMENTS

JP S47-30473 U 12/1972
JP S59-182128 A 10/1984
(Continued)

OTHER PUBLICATIONS

International Search Report for PCT/JP2018/041187 dated Jan. 22, 2019.
PCT written opinion dated Jan. 22, 2019.

*Primary Examiner* — Gregory W Adams
(74) *Attorney, Agent, or Firm* — Yokoi & Co., U.S.A.; Toshiyuki Yokoi

(57) ABSTRACT

The present invention is provided to achieve smooth devanning or depalletizing of rectangular packages while managing various situations. Package identification codes 10a, 10b, 10c, 10d are displayed at a predetermined position of each of four surfaces of front, back, left and right or on each of all surfaces of a package 5A having a rectangular shape, and code data of the identification codes is identified by a predetermined controller via a reading unit. The code data includes size information of a height size and a width size of a code display surface of the package 5A. The controller of a robot having the reading unit and a robot hand is configured to position the robot hand with the package 5A based on a code display position and the size information.

4 Claims, 8 Drawing Sheets

(51) Int. Cl.
*G06K 7/14* (2006.01)
*B25J 15/00* (2006.01)
*B65D 5/42* (2006.01)

(52) U.S. Cl.
CPC ......... *B25J 15/0014* (2013.01); *B65D 5/4212* (2013.01); *B65D 2203/06* (2013.01)

(58) Field of Classification Search
CPC ................ B65D 2203/06; B65G 67/24; G05B 2219/31312; G05B 2219/39391; G05B 2219/40014
See application file for complete search history.

(56) References Cited

U.S. PATENT DOCUMENTS

| | | | |
|---|---|---|---|
| 9,067,744 B2 * | 6/2015 | Takizawa | B25J 19/021 |
| 2008/0249663 A1 * | 10/2008 | Aoyama | G06K 7/14 |
| | | | 700/259 |
| 2013/0096713 A1 | 4/2013 | Takizawa et al. | |

FOREIGN PATENT DOCUMENTS

| | | |
|---|---|---|
| JP | H03-88624 A | 4/1991 |
| JP | H08-304025 A | 11/1996 |
| JP | 2003-20122 A | 1/2003 |
| JP | 3849633 B | 11/2006 |
| JP | 2013-86914 A | 5/2013 |
| JP | 2017-58130 A | 3/2017 |

* cited by examiner

PACKAGE IDENTIFICATION CODE, SHEET OR STICKER SHEET DISPLAYING SAME, AND ROBOT HAND USED FOR SAME

TECHNICAL FIELD

The present invention relates to a freight (package) identification code, items (objects) displaying the identification code, and a robot hand used for the freight (package) displaying the identification code, specifically suitable for automatically unloading a rectangular package stacked on a cargo deck or a palette.

BACKGROUND ART

Recently, in devanning or depalletizing a package packed in a cardboard box or the like and stacked on a cargo deck or a container, a technology has been widespread in which a programmed robot is used to automate an unloading operation to greatly reduce labor and work by humans.

For example, Japanese Unexamined Patent Application Publication No. H08-304025 discloses a method in which a camera capturing a 2D or a 3D vision is used to identify coordinates of a target package from a stack of packages. With this configuration, it is possible to automatically unload the package while positioning a robot hand with the package, which results in great reduction of labor by humans. However, in the above described method, when the rectangular packages are well aligned and stacked tightly, it may become difficult to recognize vertical/horizontal edge position(s) of the package, causing a difficulty in positioning the robot hand.

On the other hand, Japanese Patent No. 3849633 discloses a method in which an identification portion is provided at a predetermined position of the package. Based on the presence/absence of the identification portion at a predetermined detection position, a stacking pattern is determined among several kinds of pre-stored stacking patterns. Even if packages are stacked tightly, automatic unlading by a robot hand is possible. However, in the above described method, it requires labor and cost to pre-store all the stacking patterns corresponding to various types of packages. In addition, when the stacking pattern is not pre-stored or packages having various sizes are mixed, the above described method may tend to be difficult to apply.

Then, Japanese Unexamined Patent Application Publication No. 2017-58130 discloses a method in which a rectangular package includes a marker at respective four corners of all surfaces, and vertical/horizontal sides forming the corners are obtained from the markers as a rectangular surface displaying the markers. Thus, it is possible to position the robot hand. This makes it unnecessary to pre-store various types of stacking patterns. In addition, smooth unloading is possible even if the packages having various sizes are mixed.

However, the above described method requires to attach a marker at respective four corners of all the six surfaces of the rectangular box. Thus, it is impractical to attach markers on all 24 corners of existing packing boxes and packages since it takes time, labor, and cost. In order to practically execute the above described method, a special package box with the pre-printed markers has to be used.

In addition, when devanning the packages stacked in a roofed truck bed or a container, the package stacked close to the roof and left and right walls should be held at the front surface side of the package and pull the package to pick up the package. In this case, only the markers attached on the front surface can be read and a depth size cannot be unidentified. This may cause insufficient catching of the package when a center of gravity is far away from the holding position. In such a case, safe unloading may tend to be difficult.

PRIOR ART DOCUMENTS

Patent Documents

Patent Document 1: Japanese Unexamined Patent Application Publication No. H08-304025
Patent Document 2: Japanese Patent No. 3849633
Patent Document 3: Japanese Unexamined Patent Application Publication No. 2017-58130

DISCLOSURE OF THE INVENTION

Problems to be Solved by the Invention

The present invention is made to solve the above problems, and aims to achieve smooth devanning or depalletizing of the stacked rectangular packages while managing various situations.

Means for Solving the Problem

Thus, the present invention provides a package identification code displayed at a predetermined position of each of four surfaces of front, back, left and right or each of all surfaces of a package having a rectangular shape so that code data of the package identification code is configured to be identified by a predetermined controller via a reading unit, wherein the code data includes size information indicating a height size and a width size of a code display surface of the package, and the controller of a robot having the reading unit and a robot hand is configured to position the robot hand with the package based on a code display position and the size information.

As described above, the package identification code includes the size information of the height size and the width size of a surface displaying the identification code, and the robot hand is positioned based on the code display position and the size information. Thus, even when the packages are stacked tightly and the edge portions are unclear, or even when the packages are stacked in various orientations, it is possible to identify the vertical/horizontal edge portions by the size information, which indicates the height size and the width size of the code display surface, based on the code display position. Thus, smooth devanning and depalletizing can be achieved while correctly positioning the robot hand with the target package.

In addition, the code data of the above-described package identification code can include position information to identify the code display position on the code display surface. Thus, even when the package does not display all the codes at a constant position or the packages include various code display positions, use of the position information and the size information enables correct positioning.

Furthermore, the code data of the above-described package identification code can include rotation identification information to identify a rotation angle when the package is loaded in a state of being rotated from a reference posture by a magnification of 90° about a line of a central axis perpendicular to the code display surface. Thus, even when the package is loaded in a state of being rotated from the reference posture, it is possible to know a rotation direction and a rotation angle of the code display surface. Therefore, the height size and the width size of the code display surface in the actually loaded posture can be identified.

Furthermore, the code data of the above-described package identification code can include information of a depth size based on the code display surface or/and a weight of the package. Thus, it is easy to select a safe holding method even if the packages are long or heavy.

Furthermore, the above described package identification code can be a matrix-type two-dimensional code. This makes it easier to include various information such as a product number showing the contents and product information. In addition, when the matrix-type two-dimensional code includes directional information, the matrix-type two-dimensional code by itself can display the rotation identification information.

In addition, the present invention provides a sheet or a sticker sheet with an adhesive layer for displaying the package identification code and having a predetermined shape. The sheet or the sticker sheet is configured to be displayed on each of the four surfaces of front, back, left and right or each of the all surfaces of the package when the sheet or the sticker sheet is adhered to the predetermined position of each of the four surfaces or each of the all surfaces. Thus, the package identification code can be easily adhered even to the existing cardboard boxes or packing cases.

In this case, three package identification codes are arranged in an L-shape while interposing a predetermined distance between the three package identification codes so that one of the three package identification codes is located at a center of the three package identification codes and other two of the three package identification codes are arranged so as to form a right angle. The sheet or the sticker sheet is formed in the L-shape and configured to be adhered on three surfaces forming a corner portion of the package having a rectangular shape while the sheet or the sticker sheet is bent between neighboring package identification codes at a right angle so that the package identification code is displayed on each corner of the three surfaces. The package identification code is displayed on each of different three surfaces of the package only by adhering one sheet or one sticker sheet.

In addition, when the above-mentioned package identification code is printed or adhered on a packing cardboard box so as to be displayed on each of the four surfaces of front, back, left and right or each of the all surfaces at a predetermined position, it is possible to easily exert all of the above-described effects and functions by only using the cardboard box.

Furthermore, the present invention provides a robot hand for picking up the above described package displaying the package identification code, the robot hand including: the reading unit provided on an arm tip side of the robot, the reading unit being configured to read the package identification code; a support plate configured to support a bottom surface of the package from below, the support plate being capable of adjusting an angle of an upper surface of the support plate by vertically swinging a tip side of the support plate within a predetermined range; and a suction-pullout unit configured to pull out the package and place the package on the support plate while sucking the code display surface, wherein the package is configured to be held in a state of being pulled out and placed on the support plate. With this configuration, even when the gaps on top and sides of the package stacked tightly are small, it is possible to smoothly pull out and unload the package with simple configuration without cost increase.

Effects of the Invention

In the present invention, the package identification code includes the size information of the height size and the width size of the code display surface, and the robot hand is positioned based on the code display position and the size information. With this configuration, the present invention realizes smooth devanning or depalletizing of stacked rectangular packages while managing various situations.

MODES FOR CARRYING OUT THE INVENTION

Hereinafter, the embodiments of the present invention will be described with reference to the drawings. In the present invention, a term L-shape includes the L-shape in a normal orientation, the L-shape rotated by a magnification of 90° from the normal orientation, and plane symmetries of them. In the present invention, the code data includes direct information directly showing the information to be obtained and also includes indirect information to access a storage means to obtain the information pre-stored in the storage means.

Figure 1:
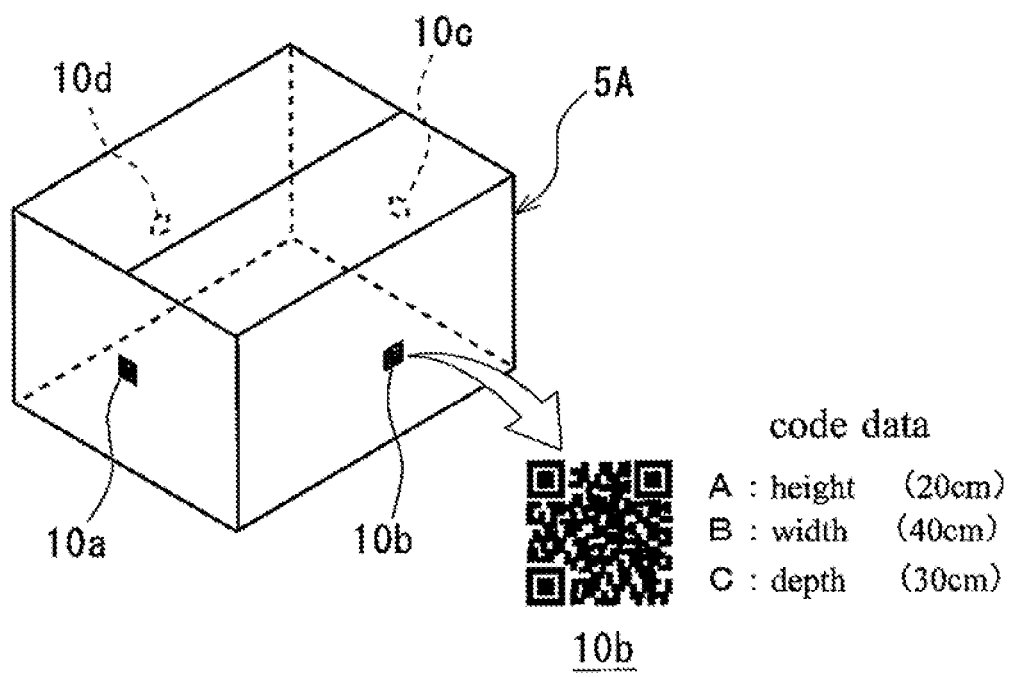
FIG. 1 is a perspective view of a package displaying package identification codes concerning the first embodiment of the present invention.

FIG. 1 shows package identification codes $10a$, $10b$, $10c$, $10d$ and a package (freight) 5A packed in a cardboard box that is an object (item) displaying the package identification code. In the present embodiment, in a basic posture of the package 5A shown in FIG. 1 (i.e., a lid is on the top and a surface with a sheet $1a$ is on the front), packages are stacked so that side surfaces (front, back, left, right) each displaying the package identification codes $10a$, $10b$, $10c$, $10d$ do not come on the top surface or the bottom surface in any case and any one of the four side surfaces always comes in the front that is configured to face a reading unit of a robot hand.

Namely, each of the package identification codes $10a$, $10b$, $10c$, $10d$ is displayed on each surface of front, back, left and right at a predetermined position of the rectangular package 5A. In addition, the package identification codes 10a, 10b, 10c, 10d are used for identifying the code data including at least a height size and a width size of the code-displaying-surface by a not-illustrated robot-side controller via a reading unit such as 2D camera. Furthermore, as for a robot which includes the reading unit and the robot hand and is controlled by the controller, the robot hand is positioned with a holding position of the package 5A based on the read and identified size information and code display position to pick up the package 5A. Note that the code data of the package identification code 10a, 10b, 10c, 10d is not limited to the above described size information directly indicating the size information. The code data can indirectly indicate the size information. For example, the code data may be the access information to access a server (storage means) such as intranet and internet. In this case, the controller of the robot hand accesses a predetermined storage means based on the access information in the code data obtained by the reading unit to obtain the size information and other information.

In addition, each code data of the package identification code 10a, 10b, 10c, 10d includes a depth size of the package 5A based on the code display surface. This makes it easier to hold (catch) the package 5A safely and pick up the package 5A easily by the robot hand. Furthermore, in the cardboard box of the package 5A, the package identification codes 10a, 10b, 10c, 10d are pre-printed on each side surface (four surfaces) and the printed position is on a vertical and horizontal center of the code display surface.

Since the above described configuration/method is adopted, even when the code data of the package identification code 10a, 10b, 10c, 10d does not include position information indicating the code display position on the surface displaying the data, the step of determining that "the code display position is coordinates obtained from a center of the height size and the width size" can be preset to the robot-side controller reading and identifying the code data. Thus, the holding portion can be correctly positioned with the package 5A while calculating the code display position based on the height size and the width size in the code data.

Therefore, even if the packages 5A are stacked tightly and the vertical edge and the horizontal edge become unclear, or even if the packages 5A are rotated horizontally and stacked in various orientations, the code display position is located on the center of the height size and width size of the code-displaying-surface. Therefore, by identifying only the height size and the width size of the code-displaying-surface, accurate and smooth devanning and depalletizing are possible while positioning the robot hand with the target package 5A based on the code display position.

In a stacking style in which multiple packages are stacked at random and the upper surface or the bottom surface of the package may come in the front, the package identification code can be printed at a predetermined position of all the surfaces (six surfaces) of the cardboard box. In addition, when the code data includes a position information indicating the code display position at the time of printing, the limitation on the printing position can be eliminated and the program to make the robot-side controller execute the above step become unnecessary.

Figure 2:
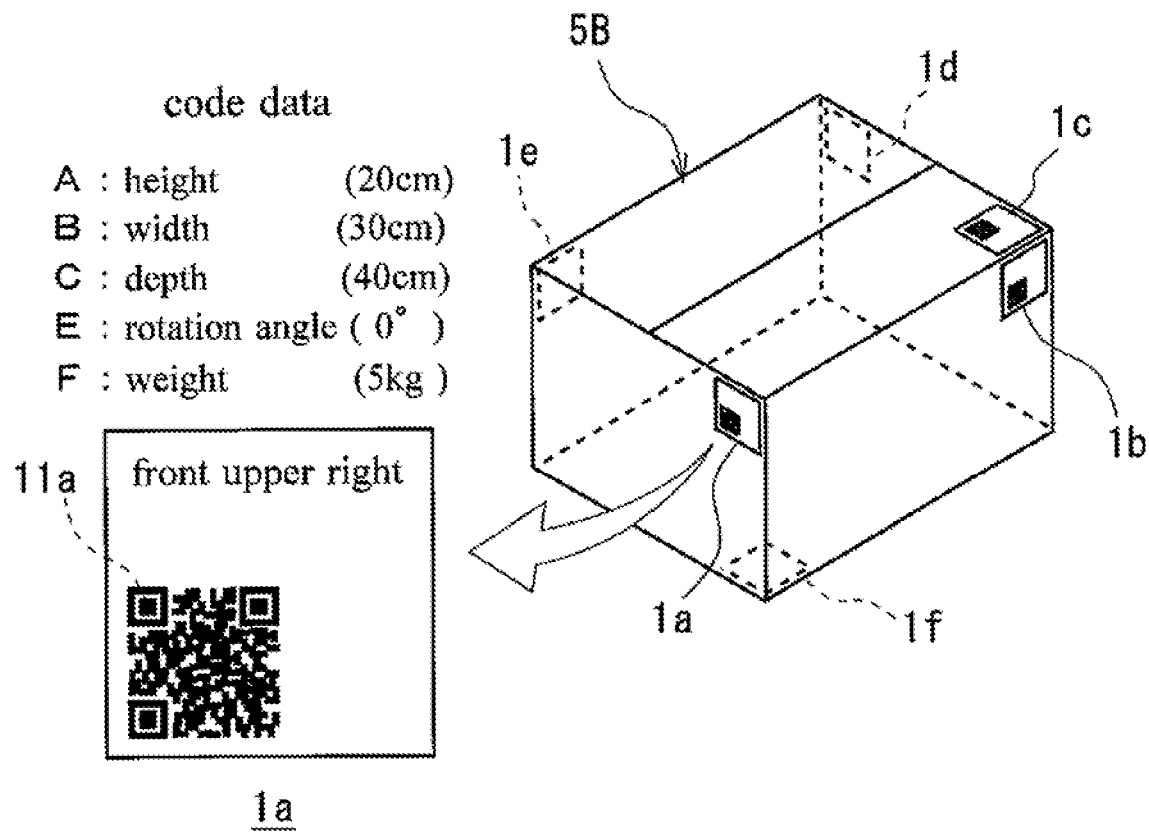
FIG. 2 is a perspective view of a package with sheets each displaying a package identification code concerning the second embodiment of the present invention.

As the second embodiment of the present invention, FIG. 2 shows package identification codes 11a-11f (reference numerals are omitted in the figure), sheets 1a, 1b, 1c, 1d, 1e, 1f (i.e., objects displaying the package identification codes 11a-11f) and a package 5B containing contents in a state that the sheets are adhered to a cardboard box. The present embodiment is suitable for the case where there are rectangular packages such as home delivery packages having various shape and size and each package contains contents having various weight and the package is sequentially carried in. In such a case, while the size and weight of the package are sequentially measured, the package identification codes 11a-11f are respectively printed on the sheets 1a, 1b, 1c, 1d, 1e, 1f and the sheets 1a, 1b, 1c, 1d, 1e, 1f are adhered on the packages.

In the present embodiment, since the packages may be stacked at random in various orientations, the sheets 1a, 1b, 1c, 1d, 1e, 1f are adhered to all the surfaces (preferably, each sheet includes a printed indication for instructing the surface/position to which the sheet is adhered). With this configuration, the package identification codes 11a-11f can be always read regardless of which surface comes in the front facing the reading unit of the robot. In addition, the code data includes the information of a depth size and a weight of the package 5B. Thus, it is easy to select a safe holding method of the robot hand.

Furthermore, in the present embodiment, the code data does not include the position information indicating the code display position. However, the sheets 1a, 1b, 1c, 1d, 1e, 1f having a square shape are adhered at a fixed position of an upper right corner of the adhered surface. For example, when a step of determining that "the code display position is coordinates of 5 cm from the top side and the right side" is pre-set to the robot-side controller, the robot hand can be correctly positioned with the package 5B similar to the case of using the package 5A.

In addition, the code data includes rotation identification information indicating a rotation angle of the package 5B when the package 5B is stacked in a state of being rotated by a magnification of 90° from a reference posture around a line (central axis) perpendicular to the code display surface displaying the package identification codes 11a-11f. Thus, even when the package 5B is stacked in the state of being rotated from the reference posture, it is possible to identify an actual height size and width size of the code display surface and an actual depth of the package 5B in the stacked posture.

Namely, the package identification codes 11a-11f of the present embodiment is a so-called matrix-type two-dimensional code configured to include the directional information. Therefore, it is possible to display the rotation identification information by itself. Also in the present embodiment, when the code data includes the position information indicating the code display position, the position to adhere the sheet is not limited as long as every sheet is correctly adhered to a position corresponding to the position information.

Figure 3A:
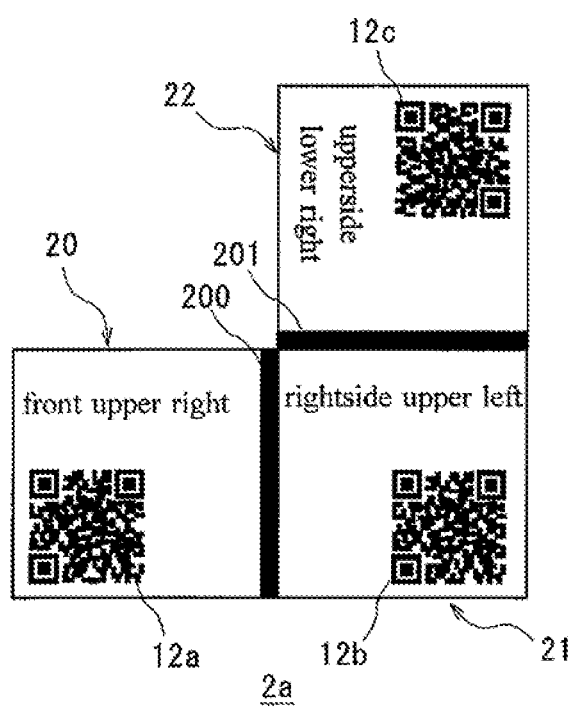
FIGS. 3A and 3B illustrate sticker sheets displaying the package identification codes concerning the third embodiment of the present invention. The sticker sheet shown in FIG. 3A is used for a corner of the front surface. The sticker sheets shown in FIG. 3B is used for a corner of the rear surface.
Figure 3B:
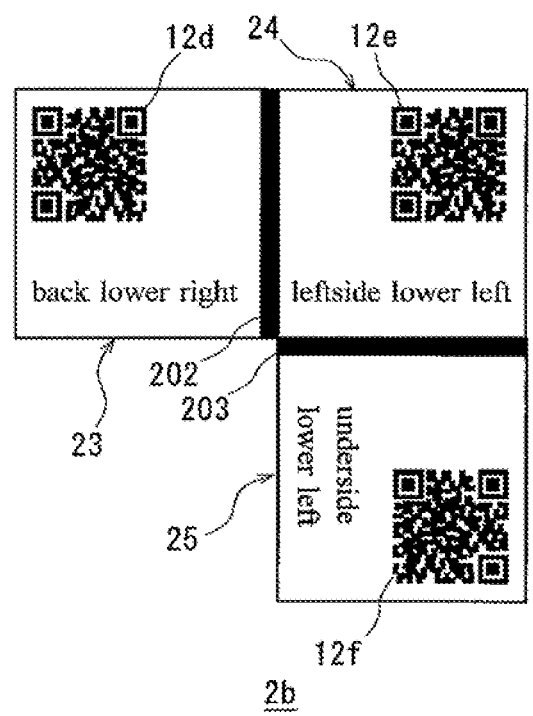
Figure 4:
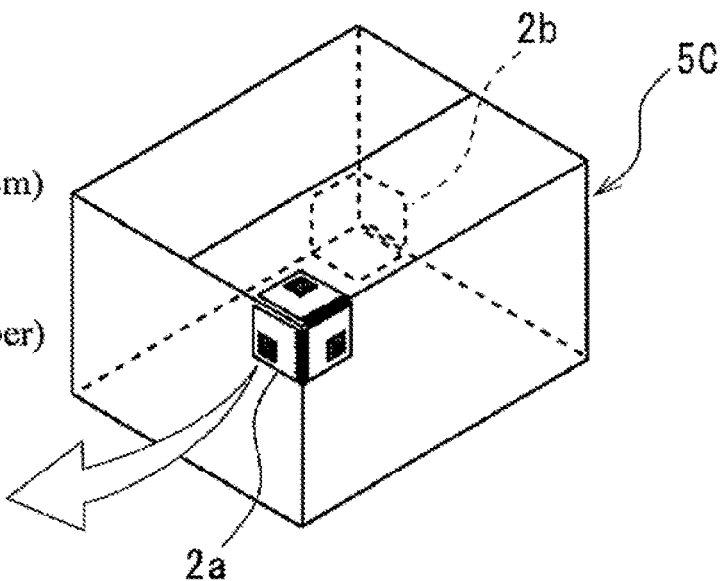
FIG. 4 is a perspective view of the package to which the sticker sheets of FIGS. 3A and 3B are adhered.
Figure 4:
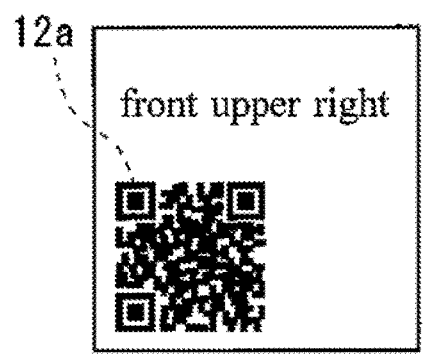

As the third embodiment of the present invention, FIGS. 3A and 3B show the package identification codes 12a-12f and sticker sheets 2a, 2b (i.e., objects displaying the package identification codes 12a-12f). FIG. 4 shows a package 5C (display object) on which the sticker sheets 2a, 2b are adhered. As shown in FIG. 3A, the present embodiment is characterized in that a sticker sheet 2a includes three package identification codes 12a, 12b, 12c arranged in an L-shape while interposing a predetermined distance between the three package identification codes 12a, 12b, 12c so that one package identification code 12b is located at a center and other two package identification codes 12a, 12b are arranged so as to form a right angle, and the sticker sheet 2a shown in FIG. 3A and the sticker sheet 2b shown in FIG. 3B are arranged in pairs.

Namely, as shown in FIG. 4, the sticker sheet 2*a* is adhered over the three surfaces of a corner portion while the sticker sheet 2*a* is bent at a right angle at the positions of bending portions 200, 201 formed between the display portions 20 and 21 (respectively displaying the package identification codes 12*a* and 12*b*) and between the display portions 21 and 22 (respectively displaying the package identification code 12*b*, 12*c*). Thus, the sticker sheet 2*a* (similarly in sticker sheet 2*b*) is formed by arranging the display portions 20, 21, 22 into the L-shape so that each of the package identification codes 12*a*, 12*b*, 12*c* is displayed on the corner of each surface. Accordingly, it is possible to display the package identification code on the three surfaces of the rectangular package only by adhering one sheet.

Therefore, as exemplarily shown in FIG. 4, only by adhering the sticker sheet 2*a* in a corner portion located on the front side of the cardboard box containing the contents and adhering the sticker sheet 2*b* in a corner portion of the back side (i.e., a diagonal position of the sticker sheet 2*a*), the package 5C is provided with the package identification codes on all the six surfaces. With this configuration, a sticking work can be completed in a relatively short time while minimizing the labor and time to identify the adhering position and the adhering direction.

In addition to the information included in the second embodiment, the present embodiment is characterized that the code data includes the position information indicating a code display position displayed on each display surface (a coordinate position obtained from each 5 cm from a vertical side and a horizontal side forming the corner portion). Therefore, the robot hand side controller does not require a program to execute the steps described above, and even if there are packages having various sizes, the controller can easily handle with them.

Furthermore, in the present embodiment, the code data includes the information indicating a product number of the contents contained in the cardboard box. Thus, the present embodiment exerts excellent logistics/storage convenience. When the size/contents of the package are known before adhering the sticker sheets, a required number of the sticker sheets 2*a*, 2*b* may be printed in advance. Even if the size/contents of the package are known immediately before adhering the sticker sheets, it is possible to relatively easily cope with such situation since printing a required number of sheets takes a short time (two sets of sticker sheets can be printed on one sheet of A4 size).

In the sticker sheets 2*a*, 2*b*, each of the package identification codes 12*a* to 12*f* is displayed at a position diagonally displaced from a center position of each of the display portions 20, 21, 22, 23, 24, 25 to secure a space for a tape closing the lid as shown in FIG. 4. Thus, the package identification codes 12*a*-12*f* are prevented from being partially hidden by an opaque tape. When the sticking method shown in the figure is used, the sticker sheet can be adhered to the cardboard box even before closing the lid, and the sticker sheet 2*a*, 2*b* can be prevented from being cut at the time of opening the lid by cutting the tape.

Figure 5:
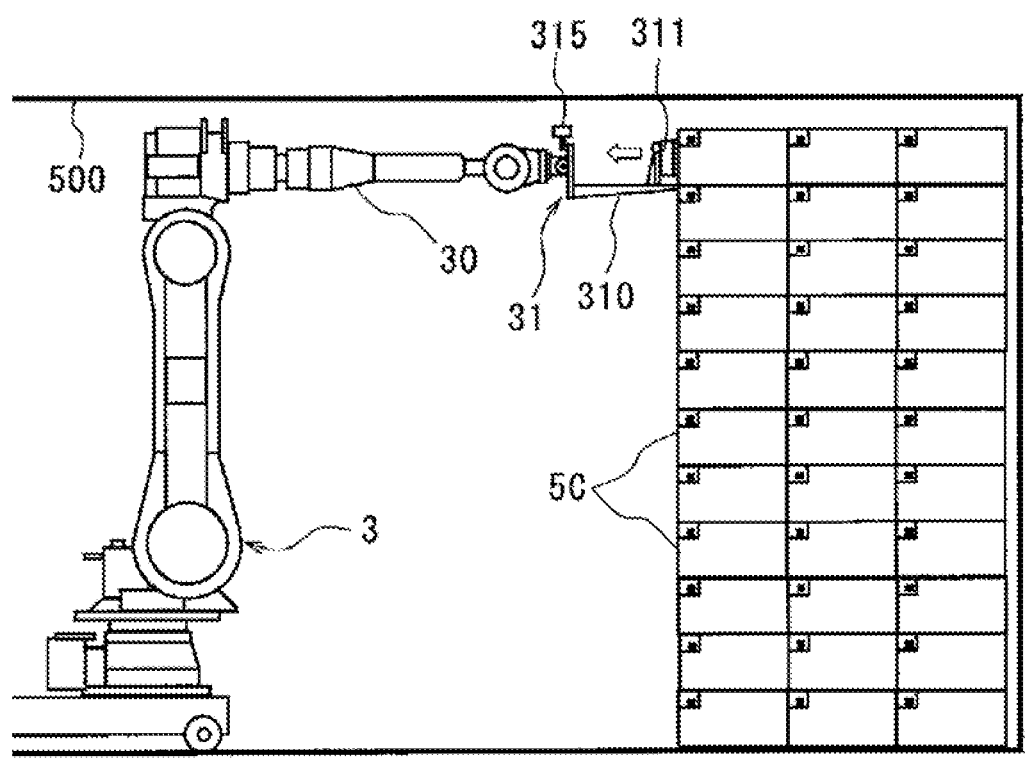
FIG. 5 is a side view showing a robot unloading the package, to which the sticker sheets are adhered, from a stack of packages of FIG. 4 in a state that a robot hand is positioned with the front surface of the package.

FIG. 5 shows a state that the sticker sheets 2*a*, 2*b* (i.e., objects displaying the above-described package identification codes 12*a*-12*f*) are adhered to a package 5C and the package 5C is unloaded by a robot 3 from a stack of the packages 5C in a container. In this case, the stack of the packages 5C stacked up tightly has small gaps between a container ceiling board 500 and between left and right boards (not illustrated). Thus, it is necessary to pull the packages 5C forward (toward a robot 3) to pick up the packages 5C placed on the top, leftmost and rightmost positions.

Thus, the robot 3 is provided with an arm 30 and a robot hand 31 arranged at a tip side of the arm 30, and the robot hand 31 includes a camera 315 that is a reading unit to read the package identification codes 12*a*-12*f*, a support plate 310 supporting a bottom surface of the target package 5C from the bottom, a suction pad 311 sucking a code display surface, and a sucking/pulling-out means formed by a structure (not shown) to pulling out the sucked package 5C and placing it on the support plate 310.

Figure 6:
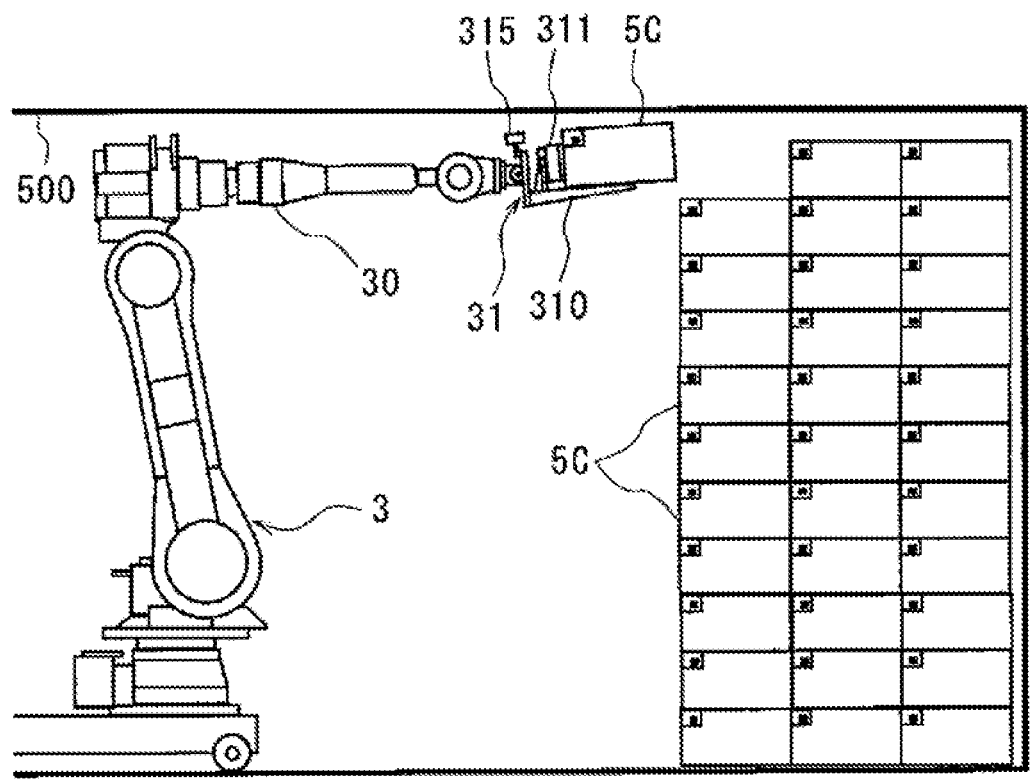
FIG. 6 is a side view showing the robot picking up the package after the state of FIG. 5.

Then, based on the size information and the position information read from the package identification codes 12*a*-12*f*, the tip side of the support plate 310 of the robot hand 31 is positioned slightly below the lower edge of the package 5C, and the suction pad 311 sucks while closely coming in contact with the package 5C. In this way, as shown in FIG. 6, the package 5C is unloaded while pulled out and picked up successively from the top of the stacked packages. Thus, even when the package 5C is stacked tightly and the gaps on top and/or side(s) of the package 5C are small, it is possible to smoothly pull out and unload the package 5C with simple configuration without cost increase.

Figure 7:
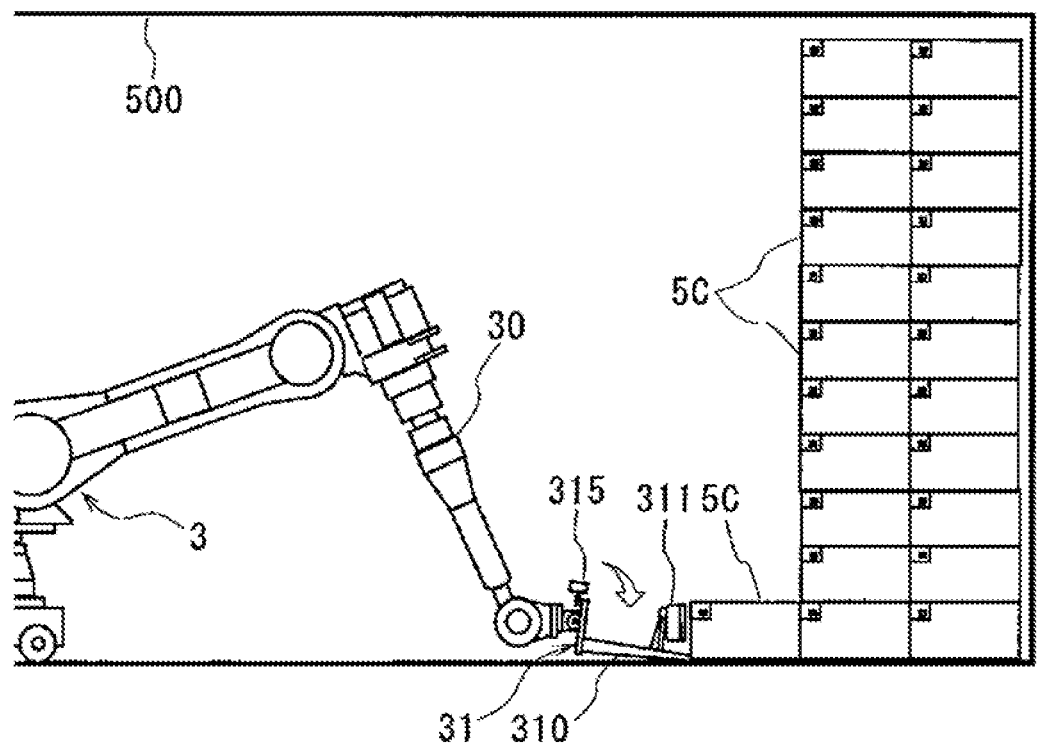
FIG. 7 is a side view showing the robot continuing to unload the package after the state of FIG. 6 and the robot hand is positioned with the lowermost package.

The robot hand 31 is configured to vertically swing the tip side of the support plate 310 within a predetermined range. As shown in FIG. 6, the tip side of the support plate 310 is lifted while the package 5C is sucked up onto the support plate 310. This makes it possible to stably hold the package 5C even if the suction pad 311 does not have a great suction power. In addition, as shown in FIG. 7, at the time of picking up the lowermost package 5C, the tip side of the support plate 310 is lowered to closely come in contact with a floor surface. Thus, the package 5C, which is closely fitted on the floor surface, can be lifted onto the support plate 310.

Figure 8:
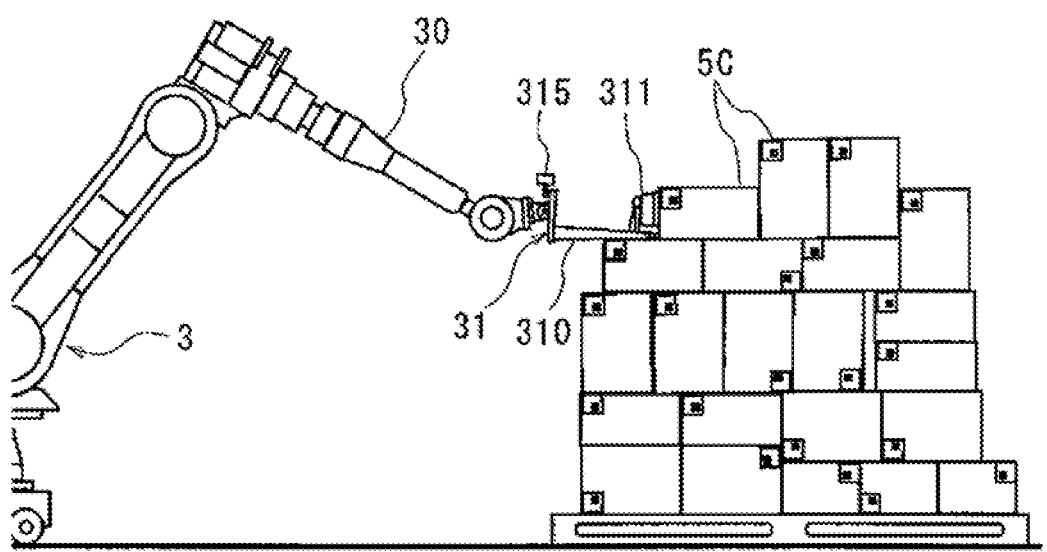
FIG. 8 is a side view showing the robot of FIG. 5 unloading the package, to which the sticker sheets are adhered, from the stack of the packages of FIG. 4 in a state that the packages are placed in various orientations on a palette.

Meanwhile, as shown in FIG. 8, the robot 3 having this robot hand 31 can also be applied to a stack of the packages 5C stacked at random in various orientations, and it is possible to pick up the stacked package 5C successively from the top while adjusting the position/angle of the support plate 310. Namely, when the package identification codes 12*a*-12*f* are read, it is possible to instantly identify the size information of the height size and the width size, even the information of the depth size and weight information, and furthermore the position information and the rotation identification information of the package 5C. Thus, it is possible to safely and smoothly unload the package 5C stacked in various orientations.

Although the illustration is omitted, even when the packages having various sizes are stacked, it is possible to smoothly unload a package by reading each package identification code to identify the condition of the package. Furthermore, as for the camera 315 (i.e., reading unit) provided on the robot hand 31, when a pair of cameras 315 is provided on each end of the left and right sides of the robot hand 31, it is possible to easily measure a distance to a holding target while capturing images in stereoscopic view. Thus, faster positioning can be achieved. In addition, if the tip side of the support plate 310 includes a contact sensor having elasticity/cushioning by a spring and the like, the lower side of the target package 5C may not be damaged and faster positioning can be achieved.

In the above-described embodiments, a description has been made of a case where the present invention is applied to an unloading work such as devanning and depalletizing. However, it should be clearly understood that the present invention can be also applied to various loading work/ transferring work such as vanning, palletizing, or moving objects onto a conveyer, and efficient work as described above can be achieved.

As described above, according to the present invention, it is possible to smoothly perform the devanning or the depalletizing stacked rectangular packages while managing various situations.

DESCRIPTION OF THE REFERENCE NUMERALS 1a, 1b, 1c, 1d, 1e, 1f: sheet, 2a, 2b: sticker sheet, 3: robot, 5A, 5B, 5C: package, 10a, 10b, 10c, 10d, 11a, 11f, 12a, 12b, 12c, 12d, 12e, 12f: package identification code, 20, 21, 22, 23, 24, 25 . . . display portion, 31: robot hand, 200, 201, 202, 203: bending portion, 310: support plate, 311: suction pad, 315: camera, 500: ceiling board

The invention claimed is:

1. A sheet or a sticker sheet displaying a package identification code displayed at a predetermined position of each of four surfaces of front, back, left and right or each of all surfaces of a package having a rectangular shape so that code data of the package identification code is configured to be identified by a predetermined controller of a robot via a reading unit, the predetermined controller having the reading unit and a robot hand, wherein
 the code data includes size information indicating a height size and a width size of a code display surface of the package,
 the predetermined controller is configured to position the robot hand with the package based on a code display position and the size information,
 the code data includes position information identifying the code display position on the code display surface by a coordinate position on the code display surface,
 the sheet or the sticker sheet has a predetermined shape,
 the package identification code is configured to be displayed on each of the four surfaces of front, back, left and right or each of the all surfaces of the package when the sheet or the sticker sheet is adhered to the predetermined position of each of the four surfaces or each of the all surfaces,
 three package identification codes are arranged in an L-shape while interposing a predetermined distance between the three package identification codes so that one of the three package identification codes is located at a center of the three package identification codes and other two of the three package identification codes are arranged so as to form a right angle,
 the sheet or the sticker sheet is formed in the L-shape and configured to be adhered on three surfaces forming a corner portion of the package having the rectangular shape while the sheet or the sticker sheet is bent between neighboring package identification codes at a right angle so that the package identification code is displayed on each corner of the three surfaces, and
 the package identification code is displayed on each of different three surfaces of the package only by adhering one sheet or one sticker sheet.

2. The package identification code according to claim 1, wherein
 the code data includes information of a depth size based on the code display surface or/and a weight of the package.

3. A robot hand for picking up the package displaying a package identification code displayed at a predetermined position of each of four surfaces of front, back, left and right or each of all surfaces of a package having a rectangular shape so that code data of the package identification code is configured to be identified by a predetermined controller of a robot via a reading unit, the predetermined controller having the reading unit and a robot hand, wherein
 the code data includes size information indicating a height size and a width size of a code display surface of the package,
 the predetermined controller is configured to position the robot hand with the package based on a code display position and the size information,
 the code data includes position information identifying the code display position on the code display surface by a coordinate position on the code display surface,
 the robot hand comprising:
  the reading unit provided on an arm tip side of the robot, the reading unit being configured to read the package identification code;
  a support plate configured to support a bottom surface of the package from below, the support plate being capable of adjusting an angle of an upper surface of the support plate by vertically swinging a tip side of the support plate within a predetermined range; and
  a suction-pullout unit configured to pull out the package and place the package on the support plate while sucking the code display surface, and
 the package is configured to be held in a state of being pulled out and placed on the support plate while positioning the tip side of the support plate with the package based on the code display position of the position information and the size information.

4. The package identification code according to claim 3, wherein
 the code data includes information of a depth size based on the code display surface or/and a weight of the package.

* * * * *